Nov. 10, 1936. A. M. DRAVING Re. 20,162
MOLDED SOCKET
Original Filed Sept. 2, 1931
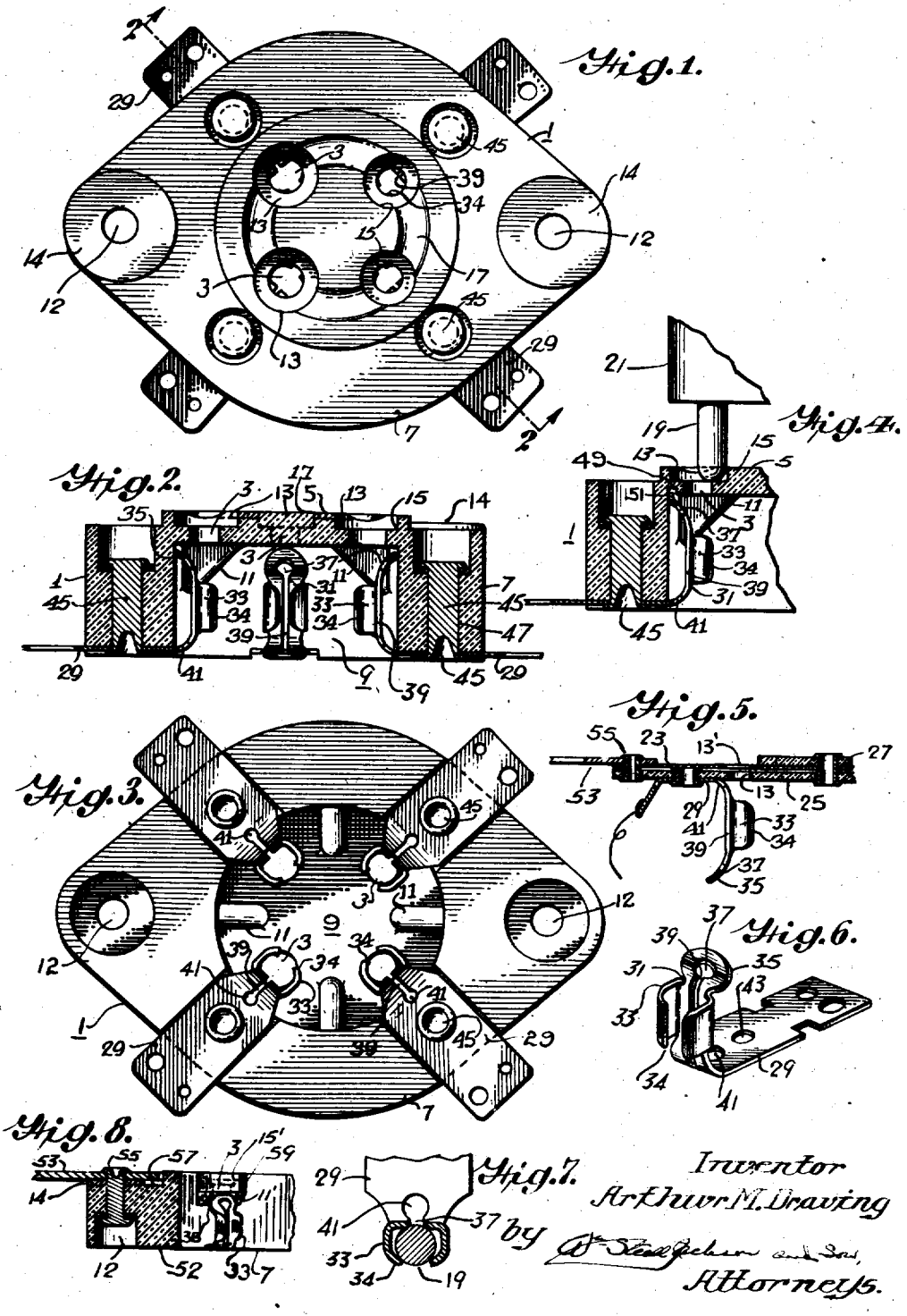
Inventor
Arthur M. Draving
by
Attorneys.

Reissued Nov. 10, 1936

Re. 20,162

UNITED STATES PATENT OFFICE 20,162

MOLDED SOCKET

Arthur M. Draving, Philadelphia, Pa., assignor to Hugh H. Eby, Philadelphia, Pa.

Original No. 1,956,376, dated April 24, 1934, Serial No. 560,680, September 2, 1931. Application for reissue April 18, 1936, Serial No. 75,243

10 Claims. (Cl. 173—328)

My invention relates to improvements in electrical receptacles for vacuum tubes, electrical plugs, and the like.

Devices of this character with which I am familiar, have in the past had the following defects: In the insertion of the prongs of vacuum tubes into their sockets, it has been found that the solder on the bottom of the prongs has traced lines of conducting material on the surface of the receptacle between the sockets or apertures in the receptacle. This has resulted in leakage paths between the terminals of the vacuum tube or other device, and it has been particularly objectionable in the case of receptacles constructed of ceramic material having a roughened or porous surface. Additionally, difficulty has been encountered in socket contact terminals, of providing contact structure adapted to make firm electrical contact along a plurality of points on the terminal prongs of the vacuum tube, or other plug-in device.

Accordingly, an object of my invention is to provide an electrical receptacle so constructed as to prevent the formation of conducting or leakage paths between terminals.

A further object of my invention is to provide a receptacle of the "low-loss" type, preferably formed of molded ceramic material, having a minimum of insulation material therein and a maximum of efficiency when used in connection with radio apparatus employing short wave lengths.

A still further object of my invention is to provide contact terminal structure for the sockets, having extreme simplicity of design and an improved electrical contact with the prongs of a plug-in device.

A still further object of my invention is to provide electrical contact structure of novel design for my improved receptacle, together with novel means for securing the contact structure in assembled relation with the receptacle.

With these and other objects in view which will appear from the following description, the invention comprises the methods and the devices described and set forth in the following specification and claims.

The various features of the invention are illustrated in the accompanying drawing in which:

Fig. 1 is a plan view of my improved socket receptacle embodying a preferred form of the invention, Fig. 2 is a longitudinal view in section of the socket receptacle shown in Fig. 1 and taken on lines 2—2, Fig. 3 is a bottom plan view of the socket receptacle shown in Figs. 1 and 2, Fig. 4 is a fragmentary view in sections similar to Fig. 2 embodying a modified form of my invention, and serving to illustrate one of the principles of my invention, Fig. 5 is a longitudinal view in section of a modified form of my improved socket receptacle, Fig. 6 is a perspective view of the novel contact element forming a part of my improved socket receptacle, Fig. 7 is a plan view partly in section of my improved resilient contact structure and serving to illustrate its operative relation to the prong terminal of a plug-in device, and Fig. 8 is a fragmentary view in longitudinal section of one end of the receptacle of Fig. 1, however, in slightly modified form.

Referring to the construction of my improved socket in Figs. 1, 2 and 3, I have provided a molded socket receptacle 1, having sockets or bores 3 in the top wall portion 5 for the insertion of the prongs of a plug-in device. The receptacle shown is composed of molded ceramic material or other desirable material having satisfactory mechanical strength and desirable low-loss characteristics for radio frequency purposes. This receptacle comprises the top portion 5 and the lower side wall portion 7, these portions forming a hollow chamber 9. In the device which I have designed and built, I have employed the brackets or partitions 11 for strengthening purposes and also for insulating reasons, located between the respective socket bores and contact structure, and connecting the top and side wall portions.

The receptacle is adapted to be secured to the metal chassis of a radio set by means of holes 12, the raised bosses 14 serving to space the top face of the receptacle from the chassis. Such relation is illustrated clearly in connection with Fig. 8, hereinafter described.

Coaxially disposed with each of said sockets or bores is a counterbore or well 13 of enlarged diameter, formed in the surface of the top wall, and having preferably a sharp corner at 15. I have shown a circular groove 17 on the surface of the top wall in alignment with the socket bores 3 for assisting in the insertion of a plug-in device. As will be obvious, the ends of the prongs are located in this groove and the plug-in device is rotated until the prongs of the polarized plug-in device come into registering relation with the corresponding sockets. Ordinarily such a groove is not essential, although in many cases the groove, or the equivalent, is desirable.

Referring to Fig. 4, I have illustrated a prong 19 of a plug-in device such as a base 21 of a vacuum tube, in the process of being inserted into the socket 3. The rounded end portion of the prong cannot come into contact with the corner 15 of the enlarged bore 13, and it is apparent that any path that is traced upon the surface of the socket between the socket bores, and particularly in the groove 17 when used, is effectively broken by the presence of the corner 15. It may be considered that this corner 15 has a radius of curvature which is less than that of the end of the prong 19.

In the modified form of Fig. 5, I have illustrated my invention in its application to a laminated socket of the type disclosed in Patent No. 1,771,094 to McFadden. Here, the aperture 13' in the top plate 23 is made larger in diameter than aperture 13 in the bottom plate 25, thereby forming in effect a step with a corner, as in Fig. 2, and for a similar purpose. The guide disc 27 is preferably made sufficiently small in diameter that its perimeter is spaced from the prong terminals of the plug-in device when in the operating position in the socket.

Referring to Fig. 6, I have illustrated, in perspective, a novel form of contact terminal structure used in the above forms of socket as shown in Figs. 1 to 5. This contact structure is formed from a strip 29 of any desirable resilient material such as phosphor-bronze, and has a portion 31 bent at right angles thereto. This portion has a pair of arms or fingers 33 extending therefrom with inwardly directed ends 34 adapted to grip the sides of a terminal prong.

The right-angled portion 31 has its end portion 35 preferably bent backwardly and provided with an aperture 37. The base portion 29 similarly has an aperture 41 therein. A slot 39 is disposed longitudinally of the right angled portion 31, and connects the apertures 37 and 41. The presence of these apertures and the slot considerably improves the resiliency and freedom of movement of the arms 33, providing a firm grip on the terminal prongs as shown clearly in Fig. 7. Here it is seen that the edges of the slot 37 and those of the ends 34, firmly contact with the prong 19, and may in fact even slightly cut into the sides of the prong, tracing four lines longitudinally thereof. This insures substantially a perfect electrical contact, and with a self cleaning action.

The contact structure 29 is adapted to be mounted in the socket receptacle by means of a rivet 45, as shown in Figs. 1 to 4, which extends through the aperture 43 in the contact and through the bore 47 in the body of the socket 1. The right angled portion of the contact structure extends up into the chamber 9 of the socket 1 substantially parallel to the side walls thereof, and with the contact arms 33, is in alignment with the socket bore 3. The bent back end 35 of the contact structure is adapted to rest against the inside walls of said chamber for reinforcing the action of the said contact structure. It will thus be seen that when the tube prongs are inserted into engagement with the contact structure the latter are sprung slightly toward the side walls, exerting an outward pressure on the prongs.

I have found that it is possible because of this construction to even omit the arms 33 and obtain a satisfactory contact between the portion 31 or slot 39 and the terminal prong of the plug-in device, although I prefer to obtain more perfect contact by means of the arms 33 in addition. The reinforced construction resulting from the end 35 of the contact bearing against said walls tends to prevent injury to the contact by the insertion of the prongs particularly when the contact structure is made of metal having the desired thinness for purpose of flexibility.

To further insure against injury or displacement of the contact I have shown in Fig. 4 a recess 49 extending into the top wall 5 and into which an upturned end or projection 51 on the end of the contact slides. An advantage of this upturned end is that it permits the end of the contact structure more easily to slide along the wall surface when the prong is inserted and forces the portion 31 of the terminal toward said wall.

This recess 49 may be in the form of a groove running around the corner of the wall and top portion of the socket but I prefer to limit its length to substantially the width of the end 51 of the terminal in order to further strengthen said contact in some cases against the possibility of sidewise displacement. It is therefore obvious that this recess 49 not only tends to prevent sidewise displacement of said contact but likewise prevents inward displacement toward the center of the socket in case the end of an inserted prong should catch on the top edge of arms 33, which are however preferably flared slightly outward and rounded as shown.

I have illustrated in Fig. 5, the mounting of substantially the same form of contact element, shown in Figs. 1 to 3, in a depending position from the laminated socket plates 23 and 25. In this construction it is not essential for obvious structural reasons that the end 35 of the terminal rest against a support because of the fact that the character of the combination is different from that above. Here a prong of the plug-in device engages the contact structure, or the upper portion of the arms 33, at a point near the base of support at 29.

Although in the above figures, I have shown but one step or break between the top surface of the socket receptacle and the socket bore, it is obvious that one or more steps or breaks may be provided if desirable. It is likewise possible, in Fig. 2, for example, to omit all or certain central portions of the top wall 5 of the socket in case it is desirable to reduce to a minimum the socket material between the prongs of a vacuum tube. Such a structure is shown in Fig. 8. Here, in effect, the receptacle consists of a ring of insulation material 52 mounted on a metal chassis 53 of a radio set by means of a plurality of rivets 55, and the boss 14 on the top of the socket reduces the tendency to breakage. The latter improves the insulation by spacing the top portion 57 away from the metal chassis. The fingers 33 may be subdivided as shown, if desired.

The contact terminals 29 are here mounted as in Fig. 8, and I have shown most of the top wall cut away, leaving a portion 59 having a socket bore 3, and if desired, a plurality of counterbores or steps at 15' around the bore 3. Brackets 11' between the socket portion 59 and the wall 7 serve to strengthen the portion 59, and additionally serve to support the end 35 of the contact terminal, as in the case of the recess 49 in Fig. 4.

It has been found that the enlarged counterbores, particularly in the absence of the guiding means such as the groove 17, facilitates insertion of the prongs into their sockets.

While I illustrated certain embodiments of my invention I do not desire to be limited by the details of construction shown therein, since I am entitled to all reasonable changes in details which might be effected by one skilled in the art.

Although the counterbored portions of the sockets have been shown as being of the same contour as the socket bore, and as positioned in concentric relation therewith, it should be obvious to one skilled in the art that the enlarged counterbores or apertures can be of any desired configuration, for example square, and furthermore that the sides of the counterbore need not be straight as shown. The counterbore may also be positioned in any desired relation with respect to the main socket bore.

What I claim as my invention is:

1. An electrical socket receptacle for a plug-in device having terminal prongs, comprising a ring of electrical insulation material, electrical contact structure for said prongs, each structure supported by one end of said ring and extending along the inside wall of said ring toward the other end thereof, and means on the end of said contact structure adjacent said other end of said ring for strengthening said contact structure and for supporting said structure from movement toward said wall during the insertion of the prongs, and characterized in that each contact structure is slotted longitudinally along an intermediate portion and is provided with a pair of contact arms extending therefrom for embracing the inserted prongs.

2. Electrical contact structure for a vacuum tube receptacle, comprising a metallic strip, said strip having a base portion for anchorage to said receptacle and a contact portion for making connection with one of the prongs of a vacuum tube, said contact portion having a longitudinal slot along one side of the said prong and having fingers extending from said contact portion on either side of said slot for embracing an inserted prong.

3. An electrical receptacle for a plug-in device having terminal plugs comprising a support of insulation material having openings in it for the passage of plugs and a plurality of contact devices secured to the support and each comprising a plate parallel to the bottom of the support and an end slitted throughout a large portion of its length and almost to its extremity and carrying contact members folded toward each other from the outer sides of the end portion along the slit, the contact members differing in contour from the contour of the plugs and adapted to engage the plugs through a part only of their circumferences.

4. As an article of manufacture for operative association with a receptacle base for vacuum tubes, a metallic contact member comprising a contact part and an angularly divergent anchoring portion, the contact part comprising a backing portion and side arms bent toward each other and forming with the backing portion a channel adapted to receive and resiliently grip a vacuum tube prong, the backing portion being of a sectional profile different from the periphery of such prong, and the arms being joined thereto by junction elements extending the full length axially of the arms so as to impart symmetrical resilience to the contact part, said arms each having a sectional profile different from the periphery of the prong so as to engage same to establish lines of contact in circumferentially spaced relation on the prong and to resiliently urge the prong and backing portion into engagement to establish a third line contact longitudinally of the prong in circumferentially spaced relation to the first mentioned lines of contact.

5. As an article of manufacture for operative association with a receptacle base for vacuum tubes, a metallic contact member comprising a contact part and a divergent anchoring portion, the contact part comprising a backing portion and side arms bent toward each other and forming with the backing portion a channel adapted to receive and grip the prong of a vacuum tube, the arms being integrally connected to the backing portion by substantially identical oppositely disposed connections so that the resilience of the channel is symmetrical to the backing portion, the arms being of a profile different from the periphery of the prong with the free ends thereof in position to engage an inserted prong to establish two lines of contact longitudinally of the prong substantially at said free ends in circumferentially spaced relation on said prong, said arms being bent outwardly between the respective free ends and the backing portion to effect non-contacting clearance between the arms and such prong, the arms adapted and arranged to resiliently urge a prong and the backing portion into engagement to establish a third line of contact longitudinally of the prong in circumferentially spaced relation to the first mentioned lines.

6. As an article of manufacture for operative association with a receptacle base for vacuum tubes, a metallic contact member comprising a contact part and a divergent anchoring portion, the contact part comprising a backing portion and side arms bent toward each other and forming with the backing portion a channel adapted to receive and grip the prong of a vacuum tube, the arms being integrally connected to the backing portion by substantially identical oppositely disposed connections so that the resilience of the channel is symmetrical to the backing portion, the arms being arranged to resiliently engage sides of a prong to establish two lines of contact longitudinally thereof in circumferentially spaced relation and to resiliently engage the prong with the backing portion, and said backing portion having a profile initially different from the contour of such prong so as to establish a third circumferentially spaced line of contact longitudinally of the prong between the prong and said backing portion, and a supplemental slot extending longitudinally of the backing portion through at least one end of said channel to enhance the resilience of said end.

7. An electrical socket receptacle for a vacuum tube having a terminal prong which comprises a receptacle base having an aperture for the reception of such prong, a metallic contact member comprising an anchoring part secured to the base and an angularly divergent contact part in substantial alignment axially of the aperture, the contact part comprising a backing portion substantially tangential to the periphery of such prong and integral side fingers bent toward each other and forming with the backing portion a channel to receive and resiliently grip such prong inserted axially of the aperture, the arms being attached to the backing portion by connecting elements which are symmetrical thereof so as to secure resilience which is symmetrical axially of the channel, the arms each having a profile different from the periphery of the prong so as to engage the prong and establish a line of contact longitudinally of the prong in circumferentially spaced relation, and simultaneously to establish a third line of contact between the prong and the backing portion in circumferentially spaced relation to the first mentioned lines.

8. An electrical socket receptacle for a plug-in device having substantially cylindrical terminal prongs, comprising an insulating support having a plurality of prong apertures, a plurality of flexible metallic contact elements mounted on the support in substantial alignment with appropriate apertures, each element comprising a back contacting portion and integral side extensions of the back portion, said back portion being substantially parallel to the axis of said aperture and to the axial path of movement of an inserted prong and merging into an angularly divergent mounting portion, said side extensions having free edges substantially parallel to such axial path when a prong is inserted in the element and being bent so as to dispose their spaced free edges on and in contact with the opposite side of a prong from the back contacting portion when a prong is inserted through the appropriate aperture and between the back portion and the free ends of said extensions, and said side extension so bent between the respective free edges and the back portion as to secure non-contacting clearance laterally of and with reference to such prong.

9. As an article of manufacture for operative association with a receptacle base for vacuum tubes, a metallic contact member comprising a contact part and an angularly divergent anchoring portion, the contact part comprising a back contacting portion and integral side extensions of the back portion bent toward each other and forming with the backing portion a channel adapted to receive and resiliently grip a vacuum tube prong, said side extensions having free edges substantially parallel to the axis of the channel when such a prong is inserted axially therein and being so bent as to dispose their spaced free edges on and in contact with the opposite side of such prong from the back contacting portion when such prong is inserted axially in the channel between the back portion and the free ends of said extensions, and said side extensions so bent between the respective free edges and the back portion as to secure non-contacting clearance laterally of and with reference to such prong, each extension and the backing portion being arranged to secure a line contact with such prong.

10. As an article of manufacture for operative association with a receptacle base for vacuum tubes, a metallic contact member comprising a contact part and an angularly divergent mounting and terminal portion, the contact part and divergent mounting and terminal portion being joined by a neck comprised of a single thickness of metal curved on an axis transverse of the contact part, the contact part comprising a backing portion and side arms bent toward each other and forming with the backing portion an open-ended channel adapted to receive and resiliently grip a vacuum tube prong, one open end of the channel being formed by the termination of the side arms on the opposite side of the curved neck from the mounting portion, the backing portion being of a sectional profile different from the periphery of such prong, and the arms being joined thereto by junction elements extending the full length axially of the arms so as to impart symmetrical resilience to the contact part, said arms each having a sectional profile different from the periphery of the prong so as to engage same to establish lines of contact in circumferentially spaced relation on the prong and to resiliently urge the prong and backing portion into engagement to establish a third line contact longitudinally of the prong in circumferentially spaced relation to the first mentioned lines of contact.

ARTHUR M. DRAVING.